(12) United States Patent
Broniak et al.

(10) Patent No.: US 9,019,120 B2
(45) Date of Patent: Apr. 28, 2015

(54) ENERGY MANAGER—WATER LEAK DETECTION

(75) Inventors: Jay Andrew Broniak, Louisville, KY (US); Michael Thomas Beyerle, Pewee Valley, KY (US); Joseph Mark Brian, Louisville, KY (US); David C. Bingham, Louisville, KY (US)

(73) Assignee: General Electric Company, Schenectady, NY (US)

( * ) Notice: Subject to any disclaimer, the term of this patent is extended or adjusted under 35 U.S.C. 154(b) by 585 days.

(21) Appl. No.: 12/942,756

(22) Filed: Nov. 9, 2010

(65) Prior Publication Data

US 2012/0026004 A1 Feb. 2, 2012

(51) Int. Cl.
*G08C 23/00* (2006.01)
*G01M 3/28* (2006.01)
*E03B 7/07* (2006.01)

(52) U.S. Cl.
CPC ............ *G01M 3/2807* (2013.01); *E03B 7/075* (2013.01)

(58) Field of Classification Search
CPC .......................................... G01F 15/06–15/07
USPC ................. 340/870.02, 606, 605; 73/46, 195; 702/45, 46, 100
See application file for complete search history.

(56) References Cited

U.S. PATENT DOCUMENTS

| | | | | |
|---|---|---|---|---|
| 5,971,011 | A * | 10/1999 | Price | 137/460 |
| 6,789,411 | B2 * | 9/2004 | Roy | 73/40.5 A |
| 6,963,808 | B1 * | 11/2005 | Addink et al. | 702/45 |
| 7,119,698 | B2 * | 10/2006 | Schleich et al. | 340/605 |
| 7,304,587 | B2 * | 12/2007 | Boaz | 340/870.02 |
| 7,317,404 | B2 * | 1/2008 | Cumeralto et al. | 340/870.02 |
| 7,330,796 | B2 * | 2/2008 | Addink et al. | 702/45 |
| 7,360,413 | B2 * | 4/2008 | Jeffries et al. | 73/195 |
| 7,383,721 | B2 * | 6/2008 | Parsons et al. | 73/46 |
| 7,920,983 | B1 * | 4/2011 | Peleg et al. | 702/100 |
| 7,966,099 | B2 * | 6/2011 | Fima | 700/276 |
| 7,969,318 | B2 * | 6/2011 | White et al. | 340/606 |
| 2006/0028355 | A1 * | 2/2006 | Patterson et al. | 340/870.02 |

* cited by examiner

*Primary Examiner* — Albert Wong
(74) *Attorney, Agent, or Firm* — GE Global Patent Operation; Marc A. Vivenzio

(57) ABSTRACT

Methods and systems are disclosed for monitoring water leaks within a home. A home network with various devices monitors these devices with a controller. Information is received from a water flow meter via a transceiver for tracking a total water flow amount through pipelines in the home. By comparing information collected to a predetermined threshold, a leak is determined as present or not within each pipeline. Upon the detection of a leak in the home, a home owner is notified of the condition so that action is taken expeditiously. A shut off valve can be triggered remotely when a request is received from the user, which closes the water pipeline to prevent water damage.

18 Claims, 3 Drawing Sheets

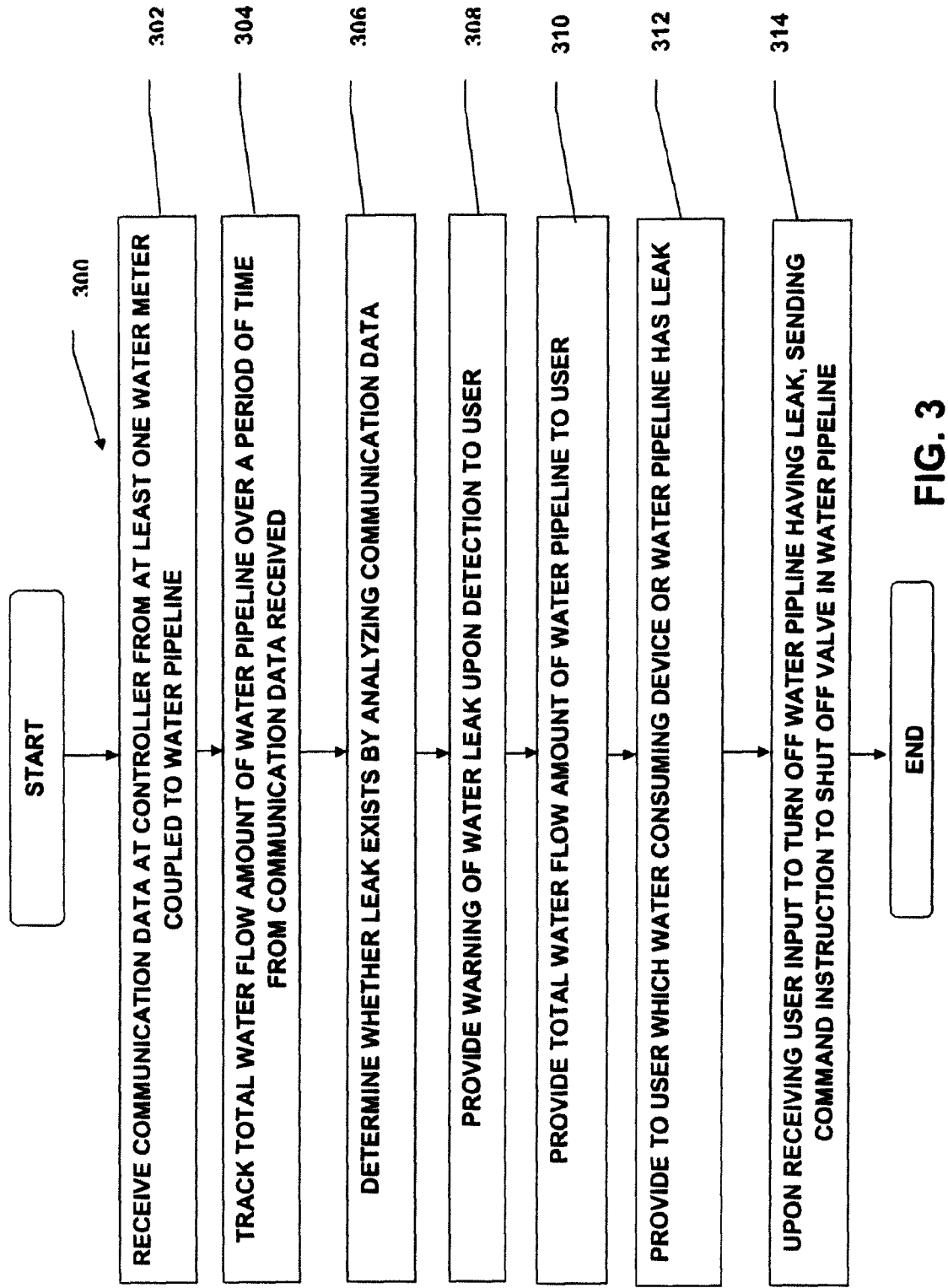

ENERGY MANAGER—WATER LEAK DETECTION

BACKGROUND

The present disclosure relates generally to methods for monitoring water pipelines and water consuming devices of a home network and systems for operating the same. More particularly, it relates to monitoring water flow of water pipes and detecting leaks therein.

A leaky pipe in a home always occurs at the worst possible moment. The leak may come from any number of devices or pipes in the home. The damage that results varies from no damage at all to major repairs and cost having to be expended. In some instances, water consuming devices in the home have malfunctioned and need to be replaced. When appliances break down that are often part of everyday life, the leak may be quickly noticeable and a fix can be quickly pursued.

For example, water heating storage tanks are used for storing and supplying hot water to households. A typical residential water heater holds about fifty gallons (190 liters) of water inside a steel reservoir tank. A thermostat is used to control the temperature of the water inside the tank. Many water heaters permit a consumer to set the thermostat to a temperature between 90 and 150 degrees Fahrenheit (F) (32 to 65 degrees Celsius (C)). To prevent scalding and to save energy, most consumers set the thermostat to heat the reservoir water to a temperature in a range between 120.0 degrees F. to 140.0 degrees F. (about forty-nine degrees C. to sixty degrees C.). As water heating and storage systems typically have a lifespan of about fifteen to twenty years varying upon the type of system. With age, the possibility of a leak in the pipes to the system increases, which potentially cause damage to the surrounding home structure, such as water through a ceiling. In addition, if a leak is not large enough to be immediately noticeable the efficiency of the water heater is compromised, and thus, a homeowner's water cost, heating and storage efficiency can suffer.

When a leak is present within a pipe, however, the leak may not be as noticeable as water dripping from the ceiling or a flooded basement when a hot water heater has broken down. Various pipes are often interlocked throughout a home to supply a continuous supply of water to many various devices (e.g., refrigerator faucets, washers, etc.). Pipeline leaks have the potential to go unnoticed for longer periods of time, if the leak is small. However, over time an equal or greater amount of damage may ensue. Damage includes loss to structure, foundational shifting, water utility cost increases, increased mold and insect infestation, etc. from a continuous flow of water leaking.

Thus, there is a need for a system that can reduce the amount of damage and cost to homes by quickly identifying leaky pipes or devices spilling water into the home and notifying the owner.

SUMMARY

The present disclosure provides a method for use within an energy management system that alerts the homeowner of a potential water leak. A central controller (e.g., a home energy manager) communicates wired/wireless signals to one or more water meters coupled to a main water pipeline and/or to various water consuming devices, such as a washer, dishwasher, sinks, toilet, etc throughout the home. The water consumption for each device and/or pipeline coupled thereto, and if a value that is out of range of the average is detected or exceeds a predetermined threshold value, the home owner is notified via a system display, a text message, or other communication method about the leak.

In one embodiment, a home network with a central controller includes at least one water meter or flow meter for measuring water that is consumed by a water consuming device. The central controller communicates with the water meter to receive information about the water flow. The central controller tracks a total water flow amount of the water pipeline during a period of time. A leak is determined as existing by comparing the total water flow amount through the pipe over the period of time to a predetermined threshold. If the water flow amount is greater than the expected threshold amount over the period of time, a potential leak has been detected. Upon determining the leak as existing, a warning from the central controller of the home is provided to the user.

BRIEF DESCRIPTION OF THE DRAWINGS

FIG. 3 illustrates a flow diagram for monitoring water consumption of a home.

DETAILED DESCRIPTION

Figure 1:
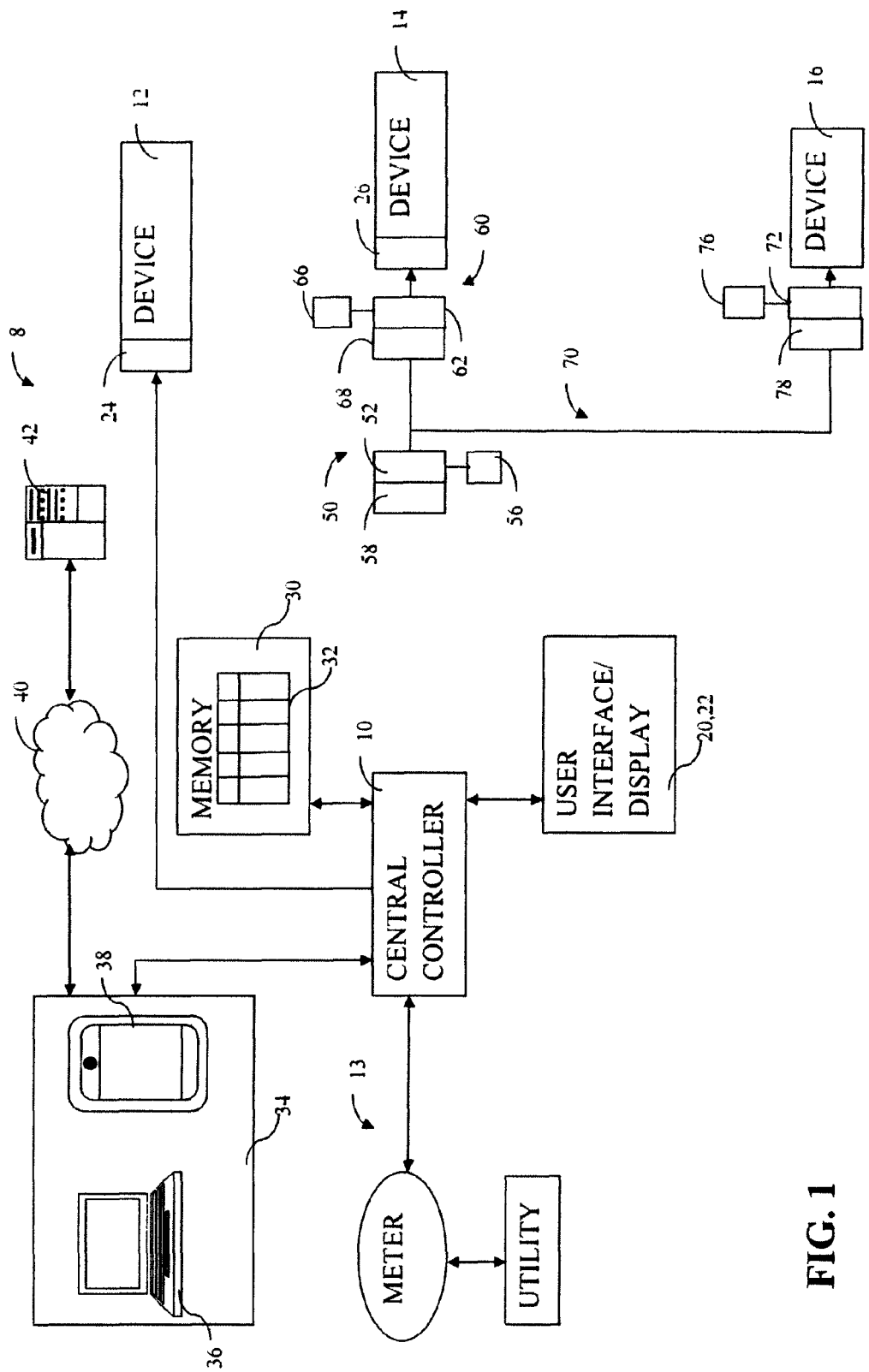
FIG. 1 is an isometric view of a water monitoring system in accordance with an illustrative embodiment of the present disclosure.

Referring to FIG. 1, illustrated is an exemplary home energy management system 8 for one or more devices 12, 14 and 16 communicatively linked to a home area network. The devices 12, 14 and 16 comprise electronic devices, devices that are electronic and water consuming with a water pipeline connected, and devices that are only water consuming without any electronics necessary. For example, the device 12 includes one or more home appliances or processing elements of a home that does not have a water pipeline connected to it and is not a water consuming device. The device 14 includes a water consuming device that is operational with an electronic device control board 26, (e.g., a dishwasher or refrigerator), and the device 16 comprises one or more water consuming devices, which does not have an electronic control therein, such as a toilet, sink or faucet. For example, the device 14, and/or 16, is a water heater, a toilet, a sink, a shower, an outdoor faucet of any kind, a water storage tank, a dishwasher, a refrigerator, any washing machine, and/or any device connected to a water line. The device 12 may also be one or more appliances (e.g., HVAC unit, or other home appliance), or processors, such as a home energy manager or a programmable communicating thermostat, or any other energy consuming devices other than appliances or water consuming devices that are coupled to the home network. The devices within the system 8, therefore, include both water consuming and electrically operated devices, and combinations thereof.

The home energy management system 8 includes a central controller 10 for managing power consumption and monitoring water consumption within a household. The controller 10 includes a micro processor, which is programmed to selectively send and/or receive signals to a device control board 24 and 26 of devices 12 and 14, for example, in response to the input signal it receives. The device controllers 24 and 26, in turn, are operable to manipulate energizing of the power consuming features/functions thereof according to a programming selection.

Within the home management system 8, the central controller 10 is configured to receive a signal 13 by a receiver and process the signal indicative of one or more energy parameters and/or a utility state of an associated energy supplying utility, for example, including availability and/or current cost of supplied energy. There are several ways to accomplish this communication, including but not limited to power line carrier (PLC) (also known as power line communication), FM, AM SSB, WiFi, ZigBee, Radio Broadcast Data System, 802.11, 802.15.4, etc. The energy signal may be generated by a utility provider, such as a power company or energy provider, and can be transmitted via a power line, as a radio frequency signal, or by any other means for transmitting a signal when the utility provider desires to reduce demand for its resources. The cost can be indicative of the state of the demand for the utility's energy. For example, a relatively high price or cost of supplied energy is typically associated with a peak demand state/period and a relative low price or cost is typically associated with an off-peak demand state/period.

The controller 10 is configured to communicate with, control and/or operate the devices 12 and/or 14 in one of a plurality of operating modes, including at least a normal operating mode and an energy savings mode in response to the received signal. Specifically, the devices 12 and/or 14 can be operated in the normal operating mode during the off-peak demand state or period and can be operated in the energy savings mode during the peak demand state or period. The central controller 10 can be configured to communicate with the devices, in no particular necessary manner or protocol, to precipitate the return of the devices to the normal operating mode after the peak demand period is over. Alternatively, the control board of each appliance could be configured to receive communication directly from the utility, process this input, and in turn, invoke the energy savings modes, without the use of the centralized controller 10.

The devices 14 and 16, which are water consuming devices, receive water from a main water inlet pipe 50 for moving water thereto. The main inlet pipe 50, for example, provides water to all devices of the home that consume water, such as through branch pipelines 60 and 70 that run from the main water inlet pipe 50 to devices 14 and 16 respectively. The device 14 includes the device control board 26, which communicates through a wired connection or a wireless communication with the central controller 10. In addition, the branch water pipelines 60 and 70 connected to the devices 14 and 16 are communicatively coupled to the central controller 10 via communication device 66 and 76, such as through a wired or wireless transmitter device. Water meters or flow meters 62 and 72 are operable to measure an amount of water that flows through the pipelines 60 and 70 and communicate information about the water flow to the controller 10.

A main water meter 52 is operatively connected to the main water inlet pipe 50 for measuring a total amount of water flow into the home and communicating information gathered to the controller 10 via a communication module 56. For example, the central controller 10 receives information from the flow meters 52, 62 and 72 on the total amount of water flowing through pipelines 50, 60, and 70 respectively over a period of time, such as in about an hour or less, for example. Each hour or in less time, therefore, the central controller 10 determines the water flow going through the pipe to determine if a leak condition exists in the pipe or device connected thereto. If the water flow exceeds a certain predetermine threshold amount, a leak is determined as existing. The predetermined threshold for determining the presence of a leak may be different for different devices and based on the amount of use a device gets over a period of time, as well as by other factors. For example, whether a water flow is continuous for an extended period of time or sporadic may also be factored into the determination. In addition, if a water flow in the pipe is excessive, a leak may be determined once a certain amount has been exceeded for a given period of time, so that if the pipe is connected to a shower device for bathing, for example, a leak would not be determined until more than an expected amount of water flows through the pipe. This threshold amount is variable depending upon the type of water consuming device. In one embodiment, the predetermined threshold may be an average amount of water based on historical use of the water consuming device with allowance for a standard deviation, for example.

In one example, a typical flow rate of a showerhead is ~2 gal/min. The homeowner could easily time the length of a typical shower. Assuming his/her average shower length is 12 minutes, this would result in the flow meter measuring 24 gallons over the 12 minutes. The user could then set the predetermined threshold value to 30 gal. If the controller ever saw 30 plus gallons being consumed over 15 minutes, then it could notify the homeowner of a possible leak.

In addition, another option would be for the controller to learn this behavior by monitoring the flow meter over the course of days/weeks. Once it learns the max value that is consumed over a given length of time it could add a buffer, to avoid the nuisance trips, and set this value as the predetermined threshold.

Another example of detecting unintended water usage involves monitoring usage by toilets which occasionally leak in the sense of failing to fully terminate the fill operation after being flushed. A typical toilet holds between 1 and 4 gallons of water. It typically takes 1-2 minutes for a toilet to refill after being flushed. In order to detect such a leak while allowing for back-to-back flushes, a threshold could be set on the order of 10 gallons over a 5 minute period. If the controller detects 10 plus gallons being consumed over 5 minutes it could notify the homeowner of a possible leak.

The controller 10 includes a user interface 20 having a display 22 and control buttons for making various operational selections. The display can be configured to provide active, real-time feedback to the user on the cost of operating each device 12, 14, 16, as well as water consumption information for the water consuming devices 14 and 16. The costs are generally based on the current operating and usage patterns and energy consumption costs, such as the cost per kilowatt-hour charged by the corresponding utility or a cost per gallon of water, for example. The controller 10 is configured to gather information and data related to current usage patterns and as well as current power costs, and generate historical usage charts therefrom. This information can be used to determine current energy usage and cost associated with using each device and in each mode an electronic device may be in. This real-time information (i.e., current usage patterns, current power cost, current energy usage/cost and water consumption) can be presented to the user via the display.

In one exemplary embodiment, the controller 10 connects via either Ethernet or WiFi to the homeowner's router and to a client application 34, for example, in a personal computer 36 and/or a mobile device 38. The controller 10 also has the ability to periodically transmit data to a central server on the Internet 40. This allows for remote service and monitoring capability. A server 42 can keep records of all homes therein that may be accessed remotely via the Internet.

In another embodiment, the total amounts of water flow through the pipelines 50, 60 and 70 are provided to the user, such as in the user display 22. In addition, a warning message can be sent to a user or homeowner about a leak that has been detected within one of the pipelines. For example, if a water flow in pipeline 70 is determined to have a leak, then a text message, email, and/or a user display message may be transmitted via the internet or on the user display 22 to inform the homeowner of a leak. Where multiple meters are placed at the main water inlet pipe 50 with meter 52 and at branch pipelines 60 and/or 70, the location of the leak or the device, which is the cause or source of the leak, can also be communicated in a message to the user.

In another embodiment, the system 8 includes shut off valves 58, 68, and 78 at respective pipelines 50, 60 and 70. The central controller 10 may receive input from the user or homeowner in response to the warning or message, and the user, for example, may respond with instructions to shut off the pipelines 50, 60, and/or 70 via the respective shut off valve 58, 68 and 78. In this manner, leaks are detected within a home and homeowners are informed of the conditions in which the water consuming devices operate. Informed decisions regarding water usage are made by the homeowner and potentially catastrophic water destruction in a home is more easily avoided. The user also has control over the water flow by enabling a shut off of any particular pipeline, such as to the whole home through the main pipeline 50 or at branch pipelines 60 and/or 70.

Figure 2:
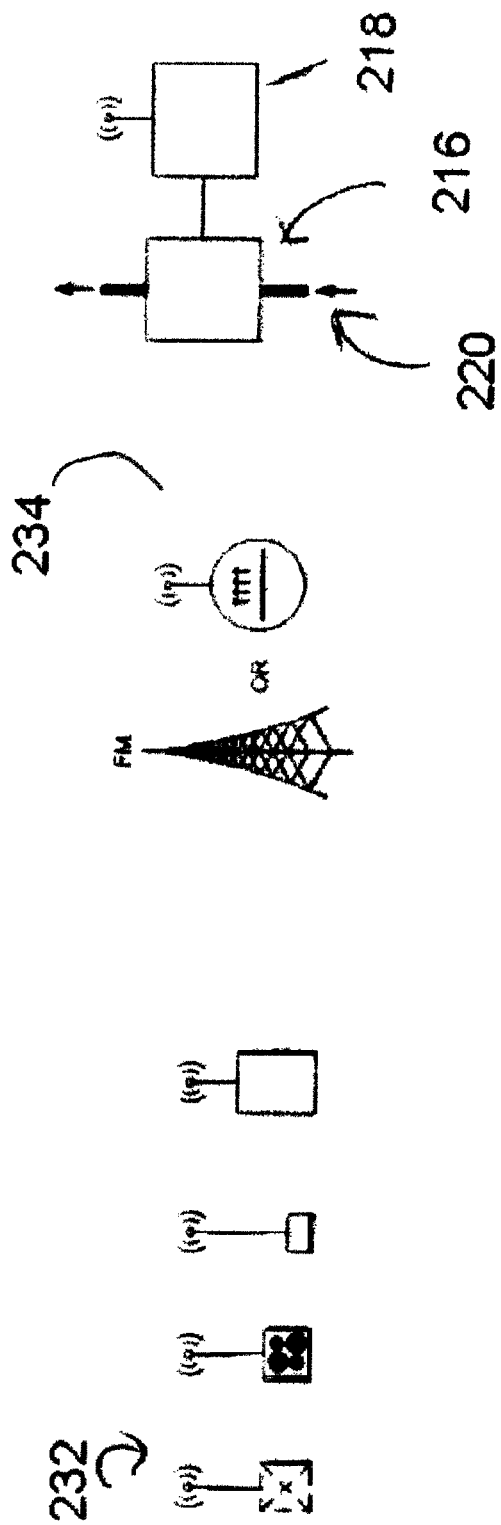
FIG. 2 illustrates water measuring and communication devices in accordance with an illustrative embodiment of the present disclosure.

For example, FIG. 2 illustrates an example of a measuring device, such as a flow meter 216 for measuring the amount of water used by various types of water consuming devices. A central controller of a home network communicates wirelessly, for example, to radios that are connected to various sensors. There are several ways to accomplish this communication, including but not limited to power line carrier (PLC) (also known as power line communication), FM, AM SSB, WiFi, ZigBee, Radio Broadcast Data System, 802.11, 802.15.4, etc. The controller of FIG. 1 may communicate directly therefore via a wired, optical and/or wireless connection, and the present disclosure is not limited to any one specific method for communicating.

Different natural resources may be monitored by the central controller 10. For example, water measurement may be monitored where the system includes a water meter 216 and a communication module that is a wireless radio module 218, for example. The water meter 216 is inserted into the home's incoming water line 220. The water meter 216 gives an output for each gal/liter/etc. of water consumed, for example, over or during a period of time. This output is sent to the radio module 218 that in turn sends the information back to the central controller 10. In one embodiment, the water utility can directly send the consumption data to the central device controller 10 via any available means, including 802.15.4 Zigbee, the Internet or IP connection 40.

Local utility and rate information is also broadcast at blocks 234 from the utility or energy provider to the controller 10 directly. The controller 10 can receive rate and schedule information as well as demand side management DSM signals to pass them on to the household appliances, such as devices 232.

The devices 232 may also transmit energy/power consumption, as well as water consumption information to the central controller 10. Referring back to FIG. 1, the controller 10 further comprises a memory 30 having at least table 32 that collects water consumption data, energy consumption, generation and/or storage data for a home or other structure (e.g., warehouse, business, etc.). The table may additionally comprise variables associated with the heating and cooling conditions of the home, for example. A table is generated for each monitored device that includes historical home data and data that is currently updated, which may be used in a client application running on a device, such as a computer or mobile phone, for presenting graphs or other data to the user.

The operation of each device 12 and/or 14 may vary as a function of a characteristic of the utility state and/or supplied energy. Because some energy suppliers offer time-of-day pricing in their tariffs, price points could be tied directly to the tariff structure for the energy supplier. If real time pricing is offered by the energy supplier serving the site, this variance could be utilized to generate savings and reduce chain demand.

Building on the ability of the central controller to periodically upload data to a central server, the system 8 has the capability for the homeowner to log onto a secure web portal and view data from their home. This will allow consumers additional flexibility to monitor their home while away.

Example methodology 300 for monitoring a home for a leak is illustrated in FIG. 3. While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

The method 300 of FIG. 3 allows monitoring of pipelines and/or water consuming devices connected to the pipelines for a leak. The method is provided for a home network at a home that includes at least one water meter for measuring water consumed by water consuming devices within the network. A central controller is communicatively linked to the water meter and includes a memory storing executable instructions for the method. The method begins at start and at 302 a communication is received by the central controller from at least one water meter, which is operatively coupled to a water pipeline for measuring water flow. The water meter can be a flow meter that is inserted in the water line or some other measuring device coupled the water pipe of a home capable of measuring water amounts or water flow amounts in a pipeline. The water pipelines include a main water pipeline and branch pipelines connected to the main pipeline and water consuming devices. Communications are received by the controller for more than one water pipeline and from more than one meter for tracking individual water pipelines and water consuming devices connected thereto. The flow meter at each pipeline, for example, has a communication module connected that wirelessly or in a wired fashion transmits communication data to the controller.

At 304 the controller tracks the information received, such as by storing the information in a memory, and over a period of time the data can be used to calculate a total water flow amount going through the pipeline. A water flow rate, an average water amount, a total water amount, for example, can be calculated by the flow meter. The period of time may vary and could be about sixty minutes or less, for example. Other increments of time are also possible.

At 306 whether a leak exists within the pipelines of the home is determined by analyzing the data received. For example, a total water flow amount over the period of time may be compared to a predetermined amount, which is a maximum threshold designated for the pipeline or may be an average amount with a standard deviation limit set. If the total water flow amount exceeds the predetermined threshold, then a leak is determined as present, for example. At 308 a warning is provided to the homeowner or user, which may be via an internet connection of the home network, via text, email, and/or on a user display at the home. Any means of communication is foreseeable and not outside the scope of this disclosure. At 310 the total water flow amount and/or other measurements gathered regarding the water in the pipelines may be also provided to the user. This can enable better and informed decisions for conserving water at the home. At 312 where the leak is present is determined and the user is provided the particular water consuming device or water pipeline that is experiencing the leak.

At 314 the network may receive a response from the user to shut off different pipelines or the main water inlet pipeline to the home via shut off valve. The controller sends information to the meter for controlling the valve. In one example, a solenoid device may be used for operating the shut off valve and sealing off the pipeline where the leak exists or the main water line pipe to the home.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A method for monitoring a home for a leak within a home network that includes a water meter for measuring water consumption within the home network and a central controller communicatively linked to the water meter, the central controller including at least one memory for storing executable instructions, the method comprising:
   tracking a total water flow to a water consuming device for a period of time;
   identifying a maximum amount of the total water flow to the water consuming device that occurs during a subinterval length of time in the period of time;
   assigning the maximum amount to a threshold value;
   receiving communication data at the central controller, the communication data reflecting a total water flow amount from a water pipeline that is operatively coupled to the water meter;
   tracking the total water flow amount of the water pipeline over the subinterval length of time from the water meter;
   analyzing the total water flow amount by comparing the total water flow amount to the threshold value; and
   generating an output to an end user that alerts the end user of a leak when the total water flow amount exceeds the threshold value for the subinterval length of time.

2. The method of claim 1, wherein the water pipeline comprises a main pipeline having a plurality of branch pipelines coupled thereto, wherein the plurality of branch pipelines provide water to different water consuming devices.

3. The method of claim 1, wherein the water consuming device includes one of a toilet, a sink, a shower, an outdoor faucet, a washing machine, a dishwasher, a refrigerator, a water storage device, and home device having a secondary pipeline connected to the water pipeline.

4. The method of claim 1, wherein the subinterval length of time is less than about sixty minutes.

5. The method of claim 2, further comprising identifying the water consuming device or the branch water pipeline in which the leak is located.

6. The method of claim 5, wherein the output comprises a communication message that identifies which water consuming device or water pipeline has the leak.

7. The method of claim 1, wherein the output comprises a warning from the central device to the end user upon detecting the leak via at least one of a text message, an email, a phone message, and a user interface display operatively coupled to the controller.

8. A method for monitoring a home for a leak within a home network that includes a plurality of water flow meters for measuring water being consumed by water consuming devices within the network and a central controller communicatively linked to the water meters and the water consuming devices, the controller including at least one memory for storing executable instructions, said method comprising:
   tracking a total water flow amount for each water pipeline of a plurality of water pipelines respectively coupled to a plurality of water consuming devices within the home network over a period of time;
   identifying a maximum amount of the total water flow to the water consuming device that occurs during a subinterval length of time in the period of time;
   assigning the maximum amount to a threshold value; and
   determining whether a leak exists at the home by comparing the total water flow amount of each water pipeline to the threshold value set for each of the water consuming devices.

9. The method of claim 8, further comprising identifying the particular water consuming device and/or water pipeline in which the leak exists, wherein water pipelines of the plurality of water pipelines respectively have a different threshold value for determining whether the leak exists.

10. The method of claim 9, further comprising providing a warning from the central controller to an end user of the home to indicate that the leak exists and from which water consuming device and/or water pipeline the leak originates.

11. The method of claim 8, wherein each water pipeline is operatively coupled to at least one of the flow meters that measure the total water flow amount incoming to the home and to each water consuming device.

12. The method of claim 11, further comprising receiving communications data at the central controller from the flow meters via a wireless transmitter, wherein the communications data indicates a total water flow amount for each water pipeline and/or a total water flow amount for the home.

13. The method of claim 10, further comprising receiving an input from the user indicating whether to turn the water pipeline with the leak off; and in response to the input, sending a communication command to trigger a shut off valve to stop water flow in the water pipeline.

14. An energy management system for a home network comprising water consuming devices coupled to water inlets at a home, said energy management system comprising:
   a central controller comprising a processor and memory for storing executable instructions;
   a water flow meter coupled to a water pipeline for each of the water consuming devices, wherein the water flow meter is configured to measure a total water flow amount in the water pipeline;
   a communication device coupled to the flow meter, the communication device configured to communicate the total water flow amount to the central controller; and
   a user device display operatively connected to the central controller that provides the total water flow amount to an end user,
   wherein the executable instructions include instructions for:
      tracking the total water flow amount to the water consuming device over a period of time;
      identifying a maximum amount of the total water flow to the water consuming device that occurs during a subinterval length of time in the period of time;

assigning the maximum amount to a threshold value; and determining whether a leak exists at the home by comparing the total water flow amount of each water pipeline to the threshold value set for each of the water consuming device.

15. The system of claim 14, wherein the central controller is configured to provide a warning to the end user that a leak exists in the water pipeline based on the total water flow amount exceeding the threshold value over the subinterval length time.

16. The system of claim 14, further comprising a shut off valve located at the water pipeline to shut off water flow therein upon the controller receiving an input from the end user to shut off the water pipeline.

17. The system of claim 14, wherein the at least one water pipeline is a main water pipeline that provides water to the home and the water consuming devices.

18. The system of claim 14, wherein the water consuming devices include one of a toilet, a sink, a shower, an outdoor faucet, a washing machine, a dishwasher, a refrigerator, a water storage device and home device having the secondary pipeline connected to the main water pipeline.

* * * * *